TELEVISION IMAGE SCANNING APPARATUS

Filed March 4, 1957 2 Sheets-Sheet 1

INVENTOR.
EUGENE O. KEIZER
BY
ATTORNEY

April 7, 1959 E. O. KEIZER 2,881,354

TELEVISION IMAGE SCANNING APPARATUS

Filed March 4, 1957 2 Sheets-Sheet 2

INVENTOR.
EUGENE O. KEIZER

BY [signature]

ATTORNEY

United States Patent Office 2,881,354

Patented Apr. 7, 1959

2,881,354

TELEVISION IMAGE SCANNING APPARATUS

Eugene O. Keizer, Princeton, N.J., assignor to Radio Corporation of America, a corporation of Delaware Application March 4, 1957, Serial No. 643,764

14 Claims. (Cl. 315—10)

The present invention relates to novel television image scanning apparatus and, particularly, to such apparatus wherein a target screen made up of a plurality of areas of respectively different chracteristics is scanned by one or more electron beams.

Certain forms of color television image reproducing apparatus, for example, include a cathode ray tube having a screen made up of a plurality of groups of horizontally disposed strips of elemental size and of respectively different component color light-emitting characteristics and employ one or more electron beams which scan along the strips in a predetermined fashion, parallel thereto, to reproduce the television image. In the case of such arrangements, exactness of scanning or tracking of the strips by the beam or beams is necessary for proper image rendition. One general form of tracking arrangement employs suitable indicia associated with the target screen to produce tracking index signals in response to electron beam impingement. In order that the beam or beams thus scanning the screen may be caused to remain properly located with respect to the strips during each horizontal line scan, it has become customary to provide what may be termed a "line locking servo" arrangement responsive to the index signals to produce an error or correction signal proportional to the amount of error between actual beam position and desired beam position. The correction signal furnished by the line locking servo circuitry is applied to means such as a deflection system for repositioning the beam or beams to effect the desired line tracking.

In the operation of such apparatus, it is necessary that successive line scans be accomplished in an orderly fashion, without any undesirable skipping or double scanning of any of the groups of phosphor strips, thereby to avoid streaks in the picture. By virtue of the fact that perfectly precise field scanning matched to equally precise target structure is extremely difficult, if not impossible, to achieve, without the aid of auxiliary control circuitry it has been found necessary to afford means for insuring orderly scanning of successive groups of phosphor strips in a predetermined sequence.

It is, therefore, a primary object of the present invention to provide novel electron beam tracking means capable of effecting the orderly scansion of a target screen of the type in question, such that successive portions of the screen are scanned in the desired sequence.

Another object of the present invention is to provide novel electron beam tracking means operative in conjunction with a line locking servo arrangement or line tracking means to insure proper positioning of one or more scanning beams with respect to the phosphor strips of a color image reproducing tube of the so-called horizontal line screen variety.

In the usual form of line locking servo arrangement, index signals (such as ultraviolet light signals in the case of index signal elements made of ultraviolet light-emitting material) are derived from the kinescope in response to electron beam impingement upon the index strips.

These index signals are suitably processed through relatively wide-band circuitry to produce the necessary line locking correction signal. Such circuitry has also been referred to as a "fast-acting servo." It has been found that the correction signal available at the output of the usual line locking arrangement is also useful to indicate the position of the electron beam or beams at the beginning of each line scan. That is to say, such signal is indicative of the vertical deflection error at the beginning of the line scan and manifests itself as an initial high frequency pulse whose amplitude and polarity are, respectively, indicative of the amount and direction of the starting error. Hence, in accordance with the present invention, means are provided for detecting the initial high frequency pulse at the beginning of each line scan when it exceeds a predetermined amplitude and developing therefrom a field scanning correction signal which is applied to a suitable storage circuit which, in turn, corrects the vertical deflection for succeeding line scansions. By virtue of the relatively simple arrangement of the present invention, orderly field scanning is effected in a manner which is independent of specific timing considerations and scanning raster shape.

Additional objects and advantages of the present invention will become apparent to those skilled in the art from a study of the following detailed description of the accompanying drawing, in which.

Figure 1:
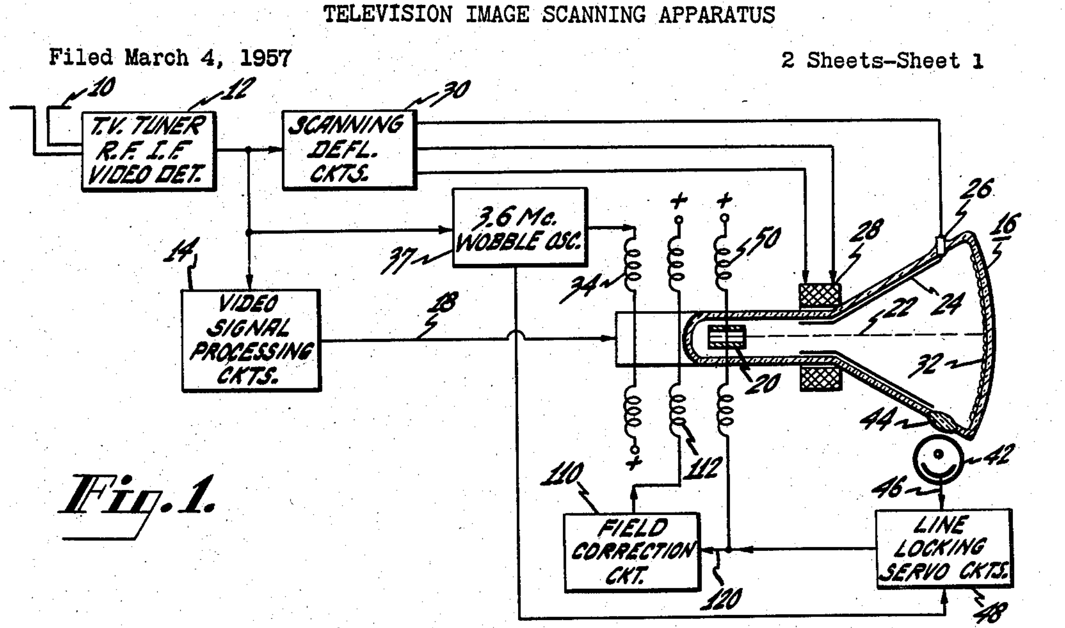
Fig. 1 illustrates, by way of a block diagram, a color television receiver embodying the principles of the present invention in accordance wtih one form thereof.

Referring to the drawing and, particularly, to Fig. 1 thereof, there is shown an illustrative color television receiver which may be of any suitable type. An antenna 10 intercepts broadcast signals which may, for example, be of the standardized color television variety and which may be viewed as comprising a first carrier wave which is amplitude-modulated by black and white image information and a subcarrier wave which is phase- and amplitude-modulated by information regarding the hue and saturation of the television subject. Such signals are applied by the antenna to the receiver section 12 which is represented diagrammatically as a block containing the usual R.F. amplifier, converter, I.F. amplifier and second or video detector stages. The detected output signals from the receiver section 12 are applied to suitable color video signal processing circuits 14 which derive simultaneous red, green and blue color-representative video signals. Circuitry suitable for deriving such signals from the form of broadcast signal standardized by the Federal Communications Commission on December 17, 1953, may be found, for example, in a book entitled "Practical Color Television for the Service Industry," revised edition, April 1954 (second edition, first printing), published by the RCA Service Co., Inc. Since, in the form of the present invention to be described in connection with Fig. 1 there is employed a horizontal line screen color kinescope 16 of the single-beam variety, the video signal processing circuits 14 are illustrated as coupled to the kinescope 16 via a lead 18 which applies to the electron beam intensity controlling electrode thereof (not shown) red, green and blue signals in rapid succession. It will be understood, therefore, that the circuits 14 include electronic sampling means for sequentially sampling the simultaneous red, green and blue signals.

The kinescope 16 may further include an electrostatic focusing electrode 20 for focusing an electron beam 22 produced by the electron gun, the electrode 20 being connected to a suitable positive potential terminal (not shown). A final anode 24, which may be in the form of a conductive coating on the interior of the kinescope cone portion is also provided with a high positive operating potential from the terminal 26. A conventional electromagnetic deflection yoke 28 comprising horizontal and vertical deflection windings is associated with the kinescope and is energized with deflection sawtooth currents of television line and field frequencies from the scanning deflection circuits 30 which receive synchronizing pulses derived from the received signals in the section 12. It is also to be noted that the kinescope beam is, in accordance with conventional practice, blanked out during each horizontal and vertical retrace period, as by means of blanking pulses applied to its control grid.

Figure 2:
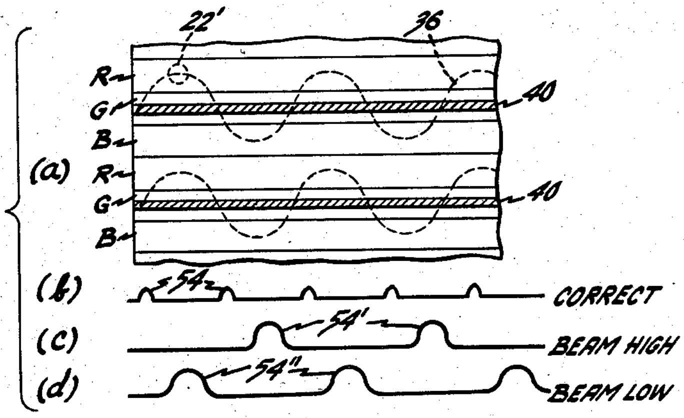
Fig. 2 illustrates a portion of the target structure of the kinescope of Fig. 1 together with certain waveforms to be described.

The color image reproducing kinescope 16 also includes a target screen 32 which is, by way of illustration, of the horizontal line phosphor strip variety shown more clearly in the enlarged fragmentary view of Fig. 2. That is, the target screen 32 is made up of a plurality of triads of phosphor strips, horizontally disposed, with the strips arranged in the sequence R, G, B, R, G, B.

The kinescope is additionally provided with an auxiliary deflection coil 34 for producing a high frequency "wobbling" of the electron beam, so that the beam is caused to trace a pattern (e.g., sinusoidal) with respect to the phosphor strips of the triad, such as that indicated in Fig. 2*a* by the dotted line 36. Specifically, and by way of example, the coil 34 may be energized from a wobble oscillator 37 which provides a continuous wave such as a wave of color subcarrier frequency (e.g., 3.6 mcs.). The oscillator 37 may be synchronized with the color subcarrier wave by means of the color synchronizing bursts which occur during the horizontal blanking intervals of the composite signal immediately following the horizontal deflection synchronizing pulses.

By virtue of the high frequency wobble of the electron beam 22, the beam is caused to traverse the phosphor strips in the sequence R, G, B, G, R, G, B. Since the beam traverses the green phosphor strip twice as often as it does the other color phosphor strips of the triad, it will be understood that the electronic sampling apparatus of the video signal processing circuits will include means for sampling the green video signal twice as often as it does either of the other video signals, so that the red, green and blue video signals may be caused to control the intensity of the beam to the instants that the beam is on the corresponding phosphor strips of the target 32.

As has been stated, color image reproducing arrangements of the type described normally require means for insuring that the electron beam of the kinescope properly "tracks" the phosphor strips. In accordance with the form of line tracking arrangement illustrated herein by way of example, each of the green phosphor strips is provided with a backing layer 40 of a material capable of emitting ultraviolet light in response to electron impingement. The strips 40 may be located behind an aluminum layer coated on the rear surface of the phosphor strips, in a known manner. A phototube 42 receives the ultraviolet light through a window 44 in the cone of the kinescope to produce a current in the lead 46 indicative of the traversal of the ultraviolet strips 40 by the sinusoidally wobbled electron beam. The strips 40 will be referred to herein as index signal generating elements or, more simply, as index strips, so that the signal produced by traversal thereof by the beam may be termed an index signal. The index signal from the phototube 42 is applied to a "line locking servo" circuit 48, which circuit also receives a reference subcarrier wave from the wobble oscillator 37. The output of the line locking servo circuit comprises a signal in the nature of a correction voltage which may be applied to a correction coil 50 for causing the electron beam to be repositioned vertically so as to track the phosphor strips throughout the line in a desired manner. The correction winding 50 may be of any suitable type capable of producing vertical shifting of the position of the electron beam 22.

As described thus far, the receiver shown in Fig. 1 is capable of producing color images by virtue of the application of color video signals in synchronism with the beam wobble. Such image reproduction, however, depends upon proper beam tracking of the phosphor strips, as will be appreciated. In order that the environment of the present invention may be further understood, the general operation of one form of line locking servo control arrangement will be described briefly. As will be seen from Fig. 2, the electron beam spot 22' travels along the sinusoidal path 36 and, when properly tracking, crosses the index strip 40 for a given color triad twice during each wobble cycle. The output signal of the phototube 42, therefore, during proper tracking will comprise a series of pulses 54 which are equally spaced in time and which occur at twice the wobble frequency, or at the rate of 7.2 mcs. per second. When the beam 22 is erroneously shifted upwardly to an extreme position so that the "negative peaks" of the sine wave 36 are closer to the index strip 60 of that triad, the tracking index signals will contain, as shown in Fig. 2*c*, a 3.6 mcs. component and phased as shown by the wave 54'. The line locking servo circuits 48 derive a correction signal by comparing the phase of the received pulses with the reference wave from the oscillator 37 and apply the correction voltage to the winding 50 for moving the beam downwardly to its proper position.

Conversely, if the electron beam is erroneously shifted downwardly so that the "positive peaks" of the sine wave 36 strike nearer the index strip 40, the pulses from the phototube 42 will have a 3.6 mcs. component phased as indicated by the wave 54'' in Fig. 2*d*. The pulses 54'' occur at the rate of 3.6 mcs. per second and are phased differently (i.e., 180° displaced) from the pulses 54' which were produced by the beam in its uppermost erroneous position. In response to the pulses 54'', the line locking servo circuits produce a correction voltage which, when applied to the coil 50, produces upward repositioning of the beam 22. It will be understood that, while the erroneous conditions illustrated are the upper and lower extremes, any departure of the beam from its proper tracking position will result in a 3.6 mcs. component in the index signal, by reason of "pairing" of the index pulses.

Figure 3:
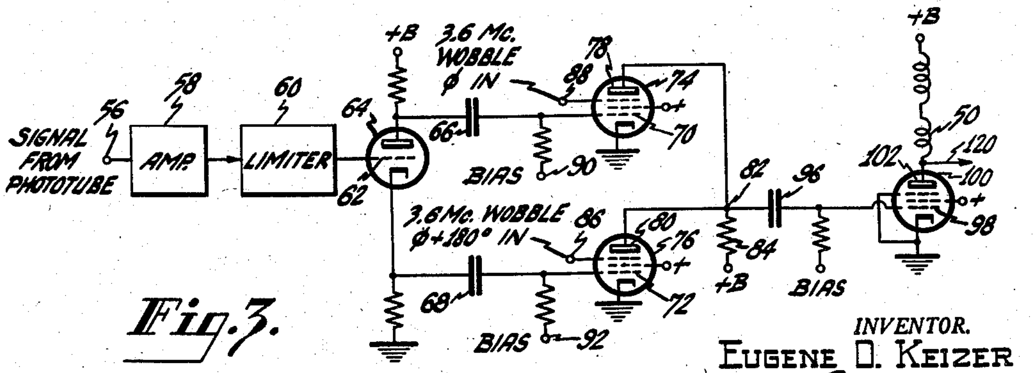
Fig. 3 illustrates schematically circuitry suitable for performing the function of the line locking servo arrangement of Fig. 1.

Further in the interest of completeness of description, there is shown in Fig. 3 circuitry suitable for performing the function of the line locking servo circuits 48. Current pulses from the phototube 42, such as those shown in waveforms (*b*), (*c*) and (*d*) of Fig. 2 are applied to the terminal 56 in Fig. 3. The pulses are amplified by a wide-band stage 58 and are limited in amplitude by a limiter circuit 60 prior to application to the control grid 62 of a phase splitter 64. Opposite phases of the pulses produced by the phototube are thus applied via capacitors 66 and 68 to the control grids 70 and 72 of comparator tubes 74 and 76, respectively, whose cathodes may, as shown, be connected to ground potential and whose anodes 78 and 80 are connected together at a common load terminal 82 at the upper end of a load resistor 84. The suppressor grid 88 receives a wave of the same phase and frequency as that of the wobble wave applied to the coil 34, while the suppressor grid 86 of the tube 76 is supplied with a wave of the opposite polarity (i.e., wobble phase plus 180°). The control grids 70 and 72 of the comparator tubes are connected to suitable bias potential terminals 90 and 92, respectively, through grid leak resistors. The common load terminal 82 of the comparators is connected via a coupling capacitor 96 to the control electrode 98 of an output amplifier 100 which is of conventional form and which includes the beam position correction winding 50 in the load circuit of its anode 102.

Assuming that the winding 50 is so oriented with respect to the kinescope 16 that increased current through the winding moves the beam 22 upwardly, while decreased current moves the beam downwardly, the operation of the circuit of Fig. 3 will be as follows: The amplifier 58 may include an even number of stages, so that the polarity reversal of an amplifier may be disregarded. The output signal of the amplifier 58 will, therefore, be understood as being a signal of the same phase as the current produced by the phototube 42 as illustrated by the waveforms of Fig. 2. After passage through the limiter stage 60, the amplified index signal is applied to the comparator 76 and the opposite phase is applied to the comparator 74, the phase reversal being accomplished in the phase splitter 64. Assuming that the beam 22 has shifted upwardly, the index signal from the phototube will comprise the pulses 54' which are of the opposite phase from the wobble wave described by the beam. The comparator tubes 74 and 76 are so biased that normally the current through the winding 50 is sufficient to maintain the beam in a centered position. When the input signal to the control grid of the comparator 74 is in phase with the wave applied to the suppressor grid 78, however, that tube will conduct more heavily, as will the tube 76, causing the voltage to the terminal 82 to decrease, thereby lowering the potential of the control grid 98 of the output amplifier 100, with the result that current through the winding 50 is decreased, in an amount sufficient to move the beam 22 downwardly to its correct position. Conversely, erroneous mispositioning of the beam downwardly in the scanning process results in a decrease in the conduction of the comparator tubes, thereby increasing the current flow through the correction coil 50 to move the beam 22 upwardly to its proper position.

As thus far described, the apparatus of Fig. 1 does not, per se, constitute a part of the present invention. Fig. 1 further illustrates, however, a field correction circuit 110 which derives the line locking correction signal from the circuits 48 and which, in turn, supplies a current to a further electromagnetic deflection-type coil 112. The function of the field correction circuit 110 is, as has been stated, that of insuring that the electron beam 22 begins successive line scans at the proper vertical position on the target 32. That is, the field correction circuit has as its function that of controlling vertical deflection of the beam 22 in such manner as to cause the beam to commence successive line scans on the triads of the screen in the desired sequence, rather than to skip or doubly-scan certain of the triads. Circuitry in accordance with one form of the present invention for performing the field correction function is illustrated in detail in Fig. 4. Prior to describing such circuitry, however, reference will be had to the waveforms of Fig. 5 in order to afford a clearer understanding of the character of the signal applied to the field correction circuit by the line locking servo circuit.

Figure 5:
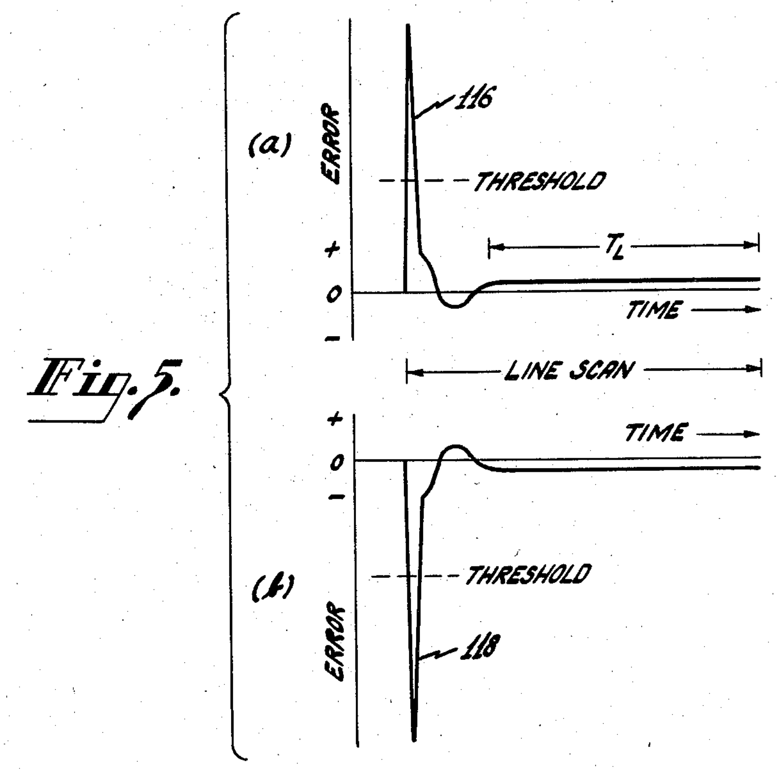
Fig. 5 illustrates certain waveforms to be described.

Referring to Fig. 5, waveforms (*a*) and (*b*) thereof illustrate typical types of line locking servo correction signals such as are produced through the use of a line locking servo of the type illusrated in Fig. 3. In each of the waveforms (*a*) and (*b*), it will be noted that, for most of the line scanning period, the error or correction signal provided by the line locking servo is a relatively low frequency signal, as indicated by that portion of the signal occurring within time $T_L$. That is to say, once the beam (or beams) has been locked into position for the scanning of a given line, the amount of error occurring during the remainder of the line will vary ordinarily, if at all, at a relatively low rate. At the end of each line scan, the beam is blanked out during retrace so that no tracking information is carried over by the line locking servo to the next line scan. At the beginning of the next line scan, however, and assuming that the electron beam is off-center with respect to the index strip with which it is to be associated during that scansion, a relatively large amplitude pulse of high frequency is produced in the line locking servo circuit output signal. Such a pulse is indicated by the spike 116 in Fig. 5(*a*), which spike is of positive polarity, indicating that, in the illustrative example, the beam is too high with respect to the index element 40 at the beginning of the line scanning period. The spike 118 in Fig. 5(*b*), on the other hand, is illustrative of the pulse produced when the beam is too low at the beginning of the line scanning interval. The amplitude of the spike is, moreover, indicative of the amount of error in beam position at the commencement of the line scan. Thus, in accordance with the present invention, means are provided for detecting the amplitude and polarity of the high frequency component of the line locking servo output signal occurring at the beginning of each line scan period, whereby to produce a correction signal, means for storing the correction signal and for adding it to the vertical deflection system of the image reproducing apparatus. The specific manner in which the correction is employed in accordance with the form of the invention illustrated in Fig. 1 is that of applying the correction signal to an auxiliary vertical deflection coil, such as the coil 112.

Figure 4:
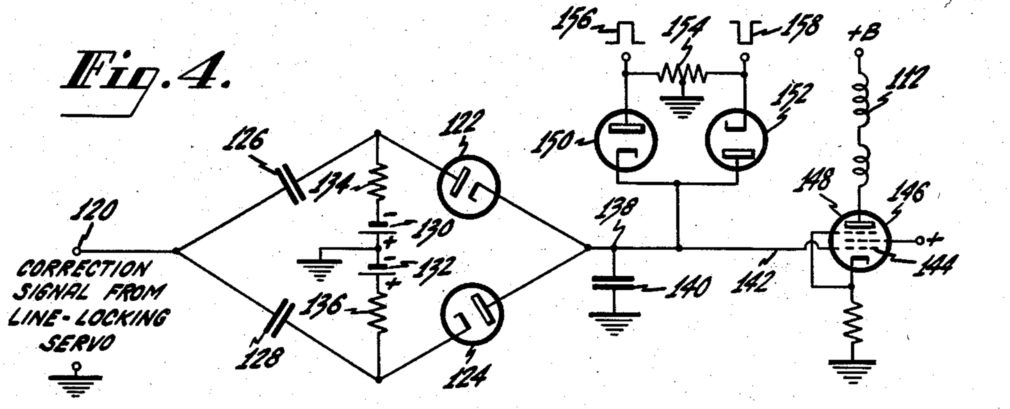
Fig. 4 illustrates circuitry in accordance with the present invention for performing the function of the field correction circuit of Fig. 1.

In order that the operation of the field-correction circuit of the present invention may be better understood, a specific, operative circuit for performing its functions is illustrated schematically in Fig. 4. In Fig. 4, the line locking servo output signal is applied to the input terminal 120 of a peak amplitude detecting circuit shown in bridge form. The bridge circuit comprises a pair of oppositely polarized diodes 122 and 124 to which the line locking correction signal is applied via capacitors 126 and 128. The capacitors serve to pass only the high frequency components of the line locking correction signal to the diodes, acting as high pass filters. The diodes 122 and 124 are biased reversely (i.e., against the direction of conductivity) by means of batteries 130 and 132 and resistors 134 and 136, respectively. The cathode of the diode 122 and the anode of the diode 124 are connected to an output terminal 138 across a storage capacitor 140, such that conduction of the diodes controls the charge on the capacitor. The capacitor 140 is further illustrated as coupled via a D.C. connection 142 to the control grid 144 of an output amplifier 146 which includes in the load circuit of its anode 148 the field-correction coil 112.

In the operation of the circuitry of Fig. 4 as described thus far, it will be understood that the diodes 122 and 124 are biased by the associated battery circuits so that neither diode is rendered conductive by an input signal applied to the terminal 120 below a predetermined threshold amplitude. The reason for such threshold biasing of the diodes is that of preventing the diodes from responding to the relatively low amplitude correction signal produced by the line locking servo circuit during its normal operation within the line scanning interval. The biasing of the diodes relative to the amplitude of the line locking servo signal applied to the terminal 120 is illustrated in Fig. 5 by the dotted lines designated "threshold." Thus, assuming that, at the beginning of a line scanning interval, the beam is properly centered with respect to the index element 40 of the phosphor triad to be scanned, the amplitude of the error pulse produced by the line locking servo circuit in response to the phototube index signal will be less than that required to overcome the threshold bias of either diode, so that the field correction circuit properly remains in a rest condition. If, however, the beam is too high or too low with respect to the index strip of the triad to be scanned at the beginning of the line, a pulse such as one of the pulses 116 and 118 will be produced in the line locking servo circuit and will appear at the terminal 120. If the beam is too high at that instant, the pulse will be a positive one such as that shown in Fig. 5(*a*) and will overcome the bias on the diode 122, causing the latter to conduct in an amount proportional to the peak amplitude of the pulse, thereby charging the capacitor 140 such that its upper terminal (point 138) becomes more positive. Such voltage change across the capacitor 140 increases conduction of the amplifier 146 such that the coil 112 in its anode circuit is caused to produce a field of sufficient magnitude and direction to return the beam to its proper position. By virtue of the storage properties of the capacitor 140, it will retain its charge throughout a field scanning period, unless some further action occurs in the bridge circuit to change the charge in the capacitor.

Thus, for example, if, at the beginning of the succeeding line scan, the beam should be too low with respect to the index element 40 of the phosphor triad to be scanned, a pulse such as that shown at 118 in Fig. 5(*b*) will appear at the terminal 120. The negative-going pulse 118 will overcome the bias on the diode 124, causing it to conduct, such that the positive charge across the capacitor 140 is decreased in an amount proportional to the amplitude of the pulse 118. Such a change in the voltage across the capacitor 140 will reduce the current flow through the amplifier 146 and coil 112 in an amount sufficient to raise the beam position to coincide with the index element.

From the foregoing, it will be understood that the circuit of Fig. 4 serves to control the voltage across the storage capacitor in such manner as to effect, when necessary, repositioning of the beam or beams of a horizontal line screen kinescope of the type in question and in such manner as to insure that the phosphor triads are traversed in the proper sequence. Moreover, it will be recognized from the foregoing description that a correction voltage stored in the capacitor 140 will remain thereacross, such that it is effectively added algebraically to the normal vertical deflection wave of the system. In order that the field correction voltage across the capacitor 140 may be erased after each field, so that the field correction system may begin its operation on the succeeding field unaffected by correction information accumulated during the preceding field, the additional circuitry of Fig. 4 is provided. That is, diodes 150 and 152 are connected with opposite polarities across the capacitor 140, the A.C. mid-point of the diodes' load impedance 154 being connected to a point of reference potential. Keying pulses occurring at field scanning rate and indicated by the positive and negative pulses 156 and 158 are applied, respectively, to the anode and cathode of the diodes 150 and 152, thereby rendering the diodes conductive in such manner as to discharge the capacitor 140. It will be recognized that the circuitry including the diodes 150 and 152 is of a conventional keyed clamp variety and does not, per se, constitute a part of the present invention. It will further be understood that the field-rate keying pulses 156 and 158 may be derived in any known manner from the vertical deflection portion of the scanning deflection circuits 30.

While, in the foregoing description of an illustrative example, the invention has been shown as employed with a horizontal line screen color kinescope involving a single electron beam, it will be recognized that the invention may also be employed with arrangements including a plurality of electron beams such, for example, as those described in U.S. Patents Nos. 2,737,608, issued March 6, 1956, to G. C. Sziklai; 2,727,184, issued Dec. 13, 1955, to T. Miller et al., and 2,587,074, issued Feb. 26, 1952, to G. C. Sziklai. Also, while the line locking servo circuit has been illustrated as associated with a separate line locking correction coil 50 and although the field correction circuit of the invention has been described as associated with its own field correction coil 112, it is to be recognized that either or both of the coils 50 and 112 may be dispensed with and the currents normally caused to flow therein may, instead, be applied to the usual vertical deflection winding of the yoke 28. By way of further definition of the present invention, it is to be noted that the field correction circuit thereof may be employed in conjunction with any line locking servo system of relatively wide band frequency response and of relatively high gain characteristics, the term "gain" being employed herein to denote the amount of correction which is afforded by the line locking servo loop.

Having thus described my invention, what I claim as new and desire to secure by Letters Patent is:

1. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; a line locking servo system coupled to said index signal deriving means to receive index signals therefrom and to produce an error signal to control the vertical position of said beam with respect to said index elements during each line scan; and field correction means responsive to said error signal for sensing the direction and amplitude of the error signal produced at the commencement of each line scan for producing a correction signal at each such line scan commencement proportional in amplitude and sense to the amplitude and direction of any vertical mispositioning of such beam at such time as it commences a line scan; and means for storing and applying such correction signal to said vertical deflection system throughout each field.

2. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; a line locking servo system coupled to said index signal deriving means to receive index signals therefrom and to produce a line correction signal to control the vertical position of said beam with respect to said index elements during each line scan; and field correction means coupled to said servo system and responsive to said line correction signal for producing a field correction signal at each such line scan commencement proportional in amplitude and sense to the amplitude and direction of any vertical mispositioning of such beam at such time as it commences a line scan; and means for storing and applying such correction signal to said vertical deflection system throughout each field.

3. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; a line locking servo system coupled to said index signal deriving means to receive index signals therefrom and to produce a correction signal to control the vertical position of said beam with respect to said index elements during each line scan; and field correction means comprising an amplitude detector circuit coupled to said servo system for detecting the amplitude of the correction signal at the commencement of each line scan and storage means operatively connected to said detector circuit for applying a field correction signal to said vertical deflection system throughout each field.

4. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; a line locking servo system coupled to said index signal deriving means to receive index signals therefrom and to produce a correction signal to control the vertical position of said beam with respect to said index elements during each line scan, such correction signal having high frequency components corresponding to rapidly occurring errors in the positioning of such beam relative to said index elements; and field correction means comprising a detection circuit responsive to only high frequency components of such correction signal for detecting the amplitude of such components and means responsive to detection circuit for controlling the position of such beam throughout a field period.

5. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; a line locking servo system coupled to said index signal deriving means to receive index signals therefrom and to produce a correction signal to control the vertical position of said beam with respect to said index elements during each line scan; and field correction means comprising an amplitude detector circuit coupled to said servo system for detecting the amplitude of the correction signal at the commencement of each line scan and storage means operatively connected to said detector circuit for applying a field correction signal to said vertical deflection system throughout each field; and means for discharging said storage means at the end of each field period.

6. Color television image reproducing apparatus which comprises: an image scanning color kinescope having a screen made up of a plurality of groups of horizontally oriented strip-like elements of respectively different preselected color light-emitting characteristics and tracking index signal producing elements associated with said strip-like elements in a fixed relation thereto and means for producing and directing an electron beam toward said screen; deflection means associated with said kinescope and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements and for producing an error signal throughout each line proportional in amplitude to any departure of such beam from its correct vertical position with respect to said index elements; and field correction means for correcting any vertical mispositioning of such beam at the beginning of each line scan, said field correction means comprising an amplitude detecting circuit coupled to said last-named means for sensing the polarity and amplitude of such error signal produced at the commencement of each line scan for producing a field correction signal at each such line scan commencement proportional in amplitude and sense to the amplitude and direction of any vertical mispositioning of such beam at such time as it commences a line scan; and means for storing and applying such correction signal to said vertical deflection system throughout each field.

7. Color television image reproducing apparatus which comprises: an image scanning color kinescope having a screen made up of a plurality of groups of horizontally oriented strip-like elements of respectively different preselected color light-emitting characteristics and tracking index signal producing elements associated with said strip-like elements in a fixed relation thereto and means for producing and directing an electron beam toward said screen; deflection means associated with said kinescope and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements and for producing an error signal throughout each line proportional in amplitude to any departure of such beam from its correct vertical position with respect to said index elements; and field correction means for correcting any vertical mispositioning of such beam at the beginning of each line scan, said field correction means comprising an amplitude detecting circuit coupled to said last-named means for sensing the polarity and amplitude of such error signal produced at the commencement of each line scan for producing a field correction signal at each such line scan commencement proportional in amplitude and sense to the amplitude and direction of any vertical mispositioning of such beam at such time as it commences a line scan; means for storing and applying such correction signal to said vertical deflection system throughout each field; and means operating in synchronism with said vertical deflection system for discharging said storing means at the end of each field.

8. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; means coupled to said index signal deriving means to receive index signals therefrom and to produce an error signal proportional to any vertical mispositioning of such beam with respect to said index elements throughout each line scan, said signal including a high frequency component at the commencement of each line scan, the amplitude and polarity of which are indicative, respectively, of the amount and direction of beam position error at such time; and field correction means comprising a pair of oppositely polarized amplitude detecting devices, frequency selective means for applying only such high frequency component of such error signal to said devices, and a storage element coupled to said devices such that conduction of one of said devices in response to such high frequency component produces a charge on said storage element; and means responsive to said charge for applying a field correction signal to said vertical deflection system throughout each field.

9. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; means coupled to said index signal deriving means to receive index signals therefrom and to produce an error signal proportional to any vertical mispositioning of such beam with respect to said index elements throughout each line scan, said signal including a high frequency component at the commencement of each line scan, the amplitude and polarity of which are indicative, respectively, of the amount and direction of beam position error at such time; and field correction means comprising a pair of oppositely polarized amplitude detecting devices, frequency selective means for applying only such high frequency component of such error signal to said devices, and a storage element coupled to said devices such that conduction of one of said devices in response to such high frequency component produces a charge on said storage element; and means responsive to said charge for applying a field correction signal to said vertical deflection system throughout each field; and means operating in synchronism with said vertical deflection system for discharging said storage element at a field rate.

10. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; means coupled to said index signal deriving means to receive index signals therefrom and to produce an error signal proportional to any vertical mispositioning of such beam with respect to said index elements throughout each line scan, said signal including a high frequency component at the commencement of each line scan, the amplitude and polarity of which are indicative, respectively, of the amount and direction of beam position error at such time; and field correction means comprising a pair of oppositely polarized amplitude detecting devices; means for biasing said devices reversely so that neither device conducts in the presence of a signal below a predetermined threshold level, frequency selective means for applying only such high frequency component of such error signal to said devices, and a storage element coupled to said devices such that conduction of one of said devices in response to such high frequency component of amplitude greater than said threshold level produces a charge on said storage element; and means responsive to said charge for applying a field correction signal to said vertical deflection system throughout each field.

11. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizontal line scansions; means for deriving beam-position index signals from said tube in response to beam impingement upon said index elements; means coupled to said index signal deriving means to receive index signals therefrom and to produce an error signal proportional to any vertical mispositioning of such beam with respect to said index elements throughout each line scan, said signal including a high frequency component at the commencement of each line scan, the amplitude and polarity of which are indicative, respectively, of the amount and direction of beam position error at such time; and field correction means comprising a bridge circuit including a pair of oppositely polarized diodes and a pair of high frequency coupling capacitors for applying only such high frequency component of said error signal to said diodes and bias means connected to said diodes to prevent them from conducting except for signals of amplitude greater than a predetermined level, and a storage capacitor connected to said diodes in such manner that conduction of either of said idodes alters the voltage across said storage capacitor; and means coupled to said storage capacitor and responsive to the voltage thereacross for controlling the vertical positioning of said beam.

12. The invention as defined by claim 11 including means for discharging said storage capacitor at the end of each field period.

13. Television image scanning apparatus which comprises: an image scanning cathode ray tube having a screen made up of a plurality of groups of horizontally oriented strip-like elements of respectively different preselected characteristics and tracking index signal producing elements associated with said strip-like elements in a fixed relation thereto and means for producing and directing an electron beam toward said screen; deflection means associated with said tube and comprising horizontal and vertical deflection systems for causing such beams to scan successive field rasters on said screen, each raster being made up of a plurality of successive, spaced horizotnal line scansions; means for deriving beam-position index signals from said tube in response to beam impingement upon said index elements; a line locking servo circuit coupled to said index signal de-riving means to receive index signals therefrom and to produce an error signal proportional to any vertical mispositioning of such beam with respect to said index elements throughout each line scan, said signal including a high frequency component at the commencement of each line scan, the amplitude and polarity of which are indicative, respectively, of the amount and direction of beam position error at such time, said servo circuit including means for controlling such beam position throughout each line; and field correction means comprising a bridge circuit including a pair of oppositely polarized diodes and a pair of high frequency coupling capacitors for applying only such high frequency component of said error signal from said servo circuit to said diodes and bias means connected to said diodes to prevent them from conducting except for signals of amplitude greater than a predetermined level, and a storage capacitor connected to said diodes in such manner that conduction of either of said diodes alters the voltage across said storage capacitor; and means coupled to said storage capacitor and responsive to the voltage thereacross for controlling the vertical positioning of said beam.

14. The invention as defined by claim 13 including means for discharging said storage capacitor at the end of each field period.

References Cited in the file of this patent

UNITED STATES PATENTS

| | | |
|---|---|---|
| 2,604,534 | Graham | July 22, 1952 |
| 2,671,129 | Moore | Mar. 2, 1954 |
| 2,689,926 | Bond | Sept. 21, 1954 |
| 2,727,184 | Miller et al. | Dec. 13, 1955 |
| 2,773,118 | Moore | Dec. 4, 1956 |